Figure 1:
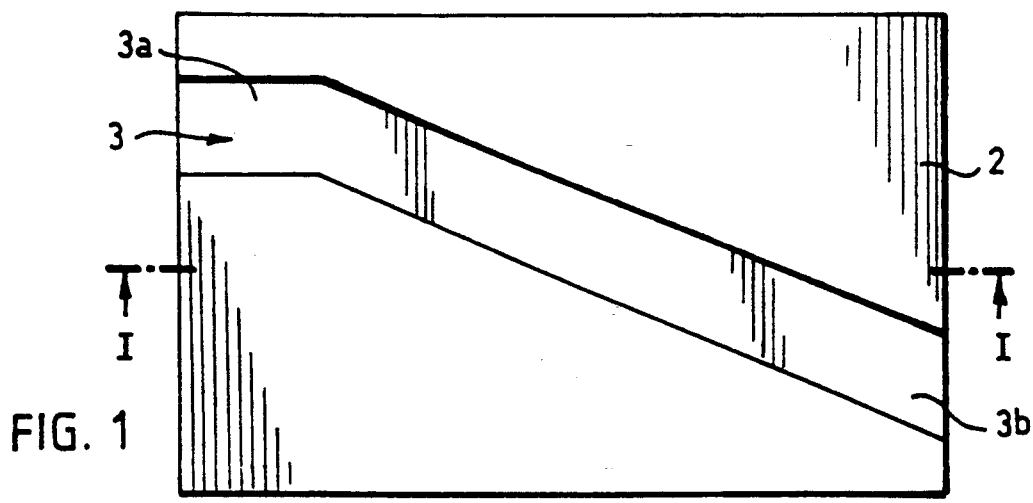

United States Patent [19]

Honkanen

[11] Patent Number: 5,151,958
[45] Date of Patent: Sep. 29, 1992

[54] ADAPTOR DEVICE FOR COUPLING TOGETHER OPTICAL WAVEGUIDES PRODUCED BY K-NA ION EXCHANGE WITH OPTICAL WAVEGUIDES PRODUCED BY AG-NA ION EXCHANGE

[75] Inventor: Seppo Honkanen, Naavatie, Finland
[73] Assignee: Oy Nokia AB, Helsinki, Finland
[21] Appl. No.: 736,514
[22] Filed: Jul. 26, 1991
[30] Foreign Application Priority Data
Aug. 23, 1990 [FI] Finland .................................. 904186
[51] Int. Cl.$^5$ .............................................. G02B 6/26
[52] U.S. Cl. ........................................ 385/50; 385/141
[58] Field of Search .................. 385/49, 50, 129, 130, 385/131, 132, 141, 142

[56] References Cited

U.S. PATENT DOCUMENTS 4,583,817  4/1986  Papuchon ..................... 385/142 X
4,897,671  1/1990  Mahapatra et al. ............ 385/130 X Primary Examiner—John D. Lee
Attorney, Agent, or Firm—Finnegan, Henderson, Farabow, Garrett & Dunner

[57] ABSTRACT

The invention relates to an adaptor device for coupling together optical waveguides of different types and a process for the production of such an adaptor device. The adaptor device of the invention comprises an optical waveguide produced on a glass substrate by ion-exchange technique, in the fundamental mode of which waveguide the field distribution of light changes adiabatically in the longitudinal direction of the optical waveguide from the field distribution of the fundamental mode of the optical waveguide produced by K-Na ion exchange to the field distribution of the fundamental mode of the optical waveguide produced by Ag-Na ion exchange.

4 Claims, 2 Drawing Sheets

ADAPTOR DEVICE FOR COUPLING TOGETHER OPTICAL WAVEGUIDES PRODUCED BY K-NA ION EXCHANGE WITH OPTICAL WAVEGUIDES PRODUCED BY AG-NA ION EXCHANGE

FIELD OF THE INVENTION

The invention relates to an adaptor device for coupling together optical waveguides produced by K-Na ion exchange and optical waveguides produced by Ag-Na ion exchange.

BACKGROUND OF THE INVENTION

By ion-exchange technique, it is possible to produce optical waveguides into a glass surface by replacing ions originally in the glass (typically sodium ions, i.e. $Na^+$ ions) by ions (such as $K^+$, $Ag^+$, $Cs^+$, $Rb^+$, $Li^+$ or $Tl^+$ ions) that increase the refractive index locally. Optical waveguide structures are patterned by thin-film technique and photolithography on some insulating or metallic film forming a so-called ion exchange mask for an ion exchange between the glass substrate and some ion source. As ion sources are often used salt melts, but in the case of Ag-Na ion exchange a thin silver film can also be used as an ion source. By using different ions, it is possible to produce waveguides with very different properties. For elementary knowledge of an ion exchange process, reference is made to the article [1] "Ion-exchanged glass Waveguides: A review", R. V. Ramaswamy, Journal of Lightware Technology, Vol. 6., No. Jun. 6, 1988.

In the following, description is primarily focussed on processes in which $Na^+$ ions are replaced either by $Ag^+$ or $K^+$ ions (Ag-Na ion exchange or K-Na ion exchange). In K-Na ion-exchanged channels the greatest possible refractive index increase is rather small (about 0,01), and therefore, K-Na ion exchange suits well for the production of optical waveguides compatible with a single-mode optical fiber. On the other hand, due to the small difference between the refractive indices of the optical waveguide and the surrounding glass substrate, the field distribution of light in K-Na ion-exchanged optical waveguides is always rather wide. This leads to a poor coupling with e.g. a laser diode having a very narrow (about 2 $\mu$m) field distribution of light. On the other hand, the width of the field distribution of an optical single-mode fiber is about 10 $\mu$m. K-Na ion exchange causes stresses on the glass, which leads to double-refraction in optical waveguides produced in this way. This can be utilized in optical components separating polarizations, but double-refraction is also a drawback, for instance in wavelength selective optical components.

By Ag-Na ion exchange again, a considerably larger refractive index increase (about 0,1) can be achieved, which makes it possible to produce optical waveguides with a considerably better compatibility with laser diodes. Additionally, thanks to the larger refractive index, smaller radii of curvature can be used in optical waveguide structures without light escaping at bends of an optical waveguide out of the optical waveguide. On the other hand, if a large refractive index difference is used in optical waveguides, the efficiency of coupling with an optical fiber is poor. Differently from K-Na ion-exchanged optical waveguides, Ag-Na ion-exchanged optical waveguides are usually not double-refractive.

It would be useful in many applications of integrated optics, if optical waveguides with very different properties could be combined in one and the same component structure. It would, for instance, be advantageous to provide a component one end of which has a good coupling with an optical fiber and the other end a good coupling with a laser diode. In the case of ion-exchange technique, this would be effected by coupling K-Na ion-exchanged and Ag-Na ion-exchanged optical waveguides on the same glass substrate. However, an adaptor device of some kind is required for coupling together two different optical waveguides inside the component with as small losses as possible.

SUMMARY OF THE INVENTION

The object of the present invention is to provide such an adaptor device and a process for its production.

This is achieved by means of an adaptor device according to the invention, wherein the adaptor device comprises an optical waveguide produced on a glass substrate by ion-exchange technique, in the fundamental mode of which waveguide the field distribution of light changes adiabatically in the longitudinal direction of the optical waveguide from the field distribution of light of the fundamental mode of an optical waveguide produced by K-Na ion exchange to the field distribution of light of the fundamental mode of an optical waveguide produced by Ag-Na ion-exchange.

Because the field distribution of light changes in the adaptor device of the invention adiabatically, i.e. slowly enough, in the longitudinal direction of the optical waveguide from the field distribution of the K-Na ion-exchanged optical waveguide to the field distribution of the Ag-Na ion-exchanged optical waveguide, hardly any amount of optical power is leaking out from the adaptor device. Then the fundamental mode of the Ag-Na ion-exchanged optical waveguide must have a higher light propagation coefficient than the K-Na ion-exchanged optical waveguide has. Since the optical waveguide in question is a single-mode one, the fundamental mode is the only propagating mode.

The object of the invention is also a process for the production of the adaptor device of the invention, which process comprises the following steps:

a production of a first optical waveguide on a glass substrate by K-Na ion exchange, a formation of an ion-exchange mask on the glass substrate in such a way that a longitudinal mask opening in the ion-exchange mask at its one end overlaps the first optical waveguide, the amount of the overlapping changing gradually in the direction of the longitudinal axis of the mask opening, and a production of a second optical waveguide on the glass substrate by Ag-Na ion exchange using said ion-exchange mask.

The process of the invention utilizes the fact that the diffusion constant of potassium in glass at a certain temperature is much smaller during K-Na ion exchange than is the diffusion constant of silver during Ag-Na ion exchange. Thus, if the same glass substrate is at first subjected to a K-Na ion exchange and after this in the second step to an Ag-Na ion exchange at a considerably lower temperature, practically no diffusion of potassium occurs during the Ag-Na ion exchange. Due to this, K-Na and Ag-Na ion-exchanged optical waveguides can be produced on the same glass substrate, almost irrespective of each other. Additionally, the $K^+$ ions diffused in the glass during the K-Na step prevent nearly totally a diffusion of Ag+ ions in the glass during the Ag-Na ion-exchange step. It is thus possible to say that the K-Na ion-exchanged optical waveguide is used as an ion-exchange mask during the Ag-Na ion-exchange in such a way that the width of the Ag-Na ion-exchanged optical waveguide can be made to grow gradually parallelly with the K-Na ion-exchanged optical waveguide in the longitudinal direction of the adaptor device and the adiabatic condition mentioned above will be fulfilled well enough in the final adaptor.

In the process of the invention, a window of an ion-exchange mask to be used at Ag-Na ion-exchange overlaps partly a K-Na ion-exchanged optical waveguide and the overlapping changes slowly in the direction of the longitudinal axis of the optical waveguide. No Ag ion exchange occurs at the places where the window of the ion-exchange mask overlaps the K-Na ion-exchanged optical waveguide. Ag-Na ion-exchange can occur quite freely at those places of the mask window where there is no K-Na ion-exchanged optical waveguide. Due to this, an adaptor device of the invention is provided, in which a K-Na ion-exchanged optical waveguide changes in the longitudinal direction of the optical waveguide adiabatically to an Ag-Na ion-exchanged optical waveguide.

A BRIEF DESCRIPTION OF THE DRAWINGS

Figures 6A, 6B:
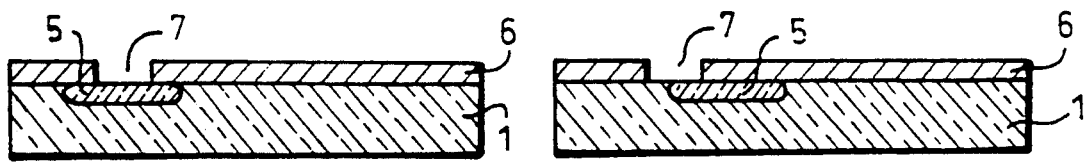
Figure 6C:
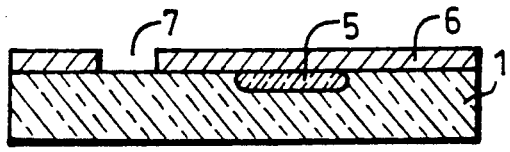
Figures 7A, 7B:
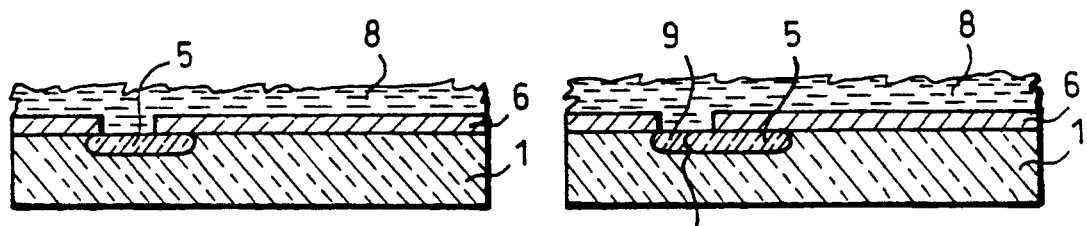
Figure 7C:
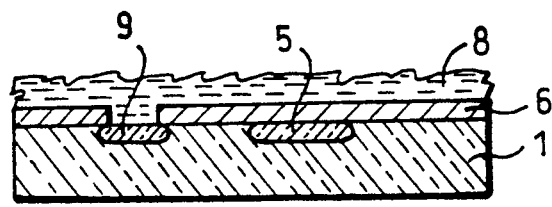
Figure 8:
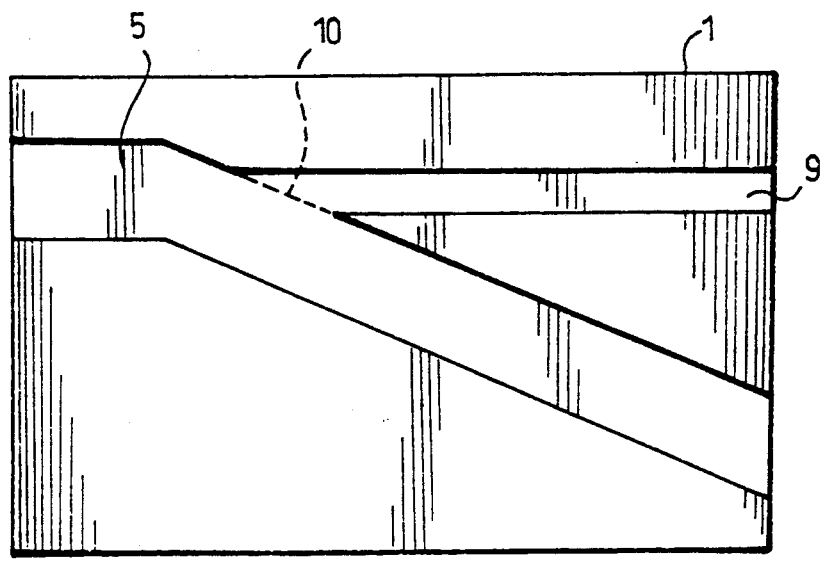

The invention will now be explained in greater detail by means of an illustrating embodiment with reference to the enclosed drawing, in which FIG. 1 to 5, 6A to 6C, 7A to 7C and 8 illustrate various steps of a process for the production of an adaptor device of the invention, FIG. 8 shows the adaptor device provided by the process according to the FIGS. 1 to 5, 6A to 6C, 7A to 7C and 8 from above.

A DETAILED DESCRIPTION OF THE INVENTION

Figure 2:
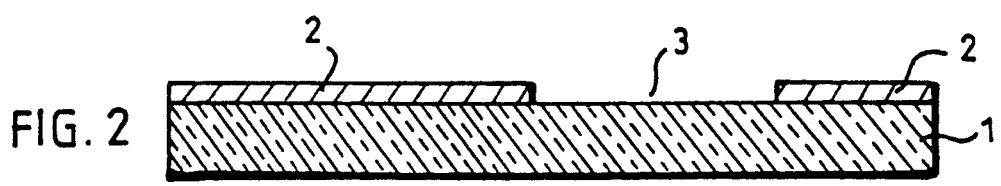

In the process of the invention, a thin metallic film 2 is grown for instance by sputtering on one planar surface of a preferably sheet-like glass substrate 1, on which film are provided patterns of openings 3 by lithography technique, as illustrated in FIGS. 1 and 2. The thin-film mask used in the invention forms a so-called positive mask pattern, in which the openings 3 correspond to optical waveguides to be formed and the metallic film portions 2 correspond to areas within which no ion exchange and thus no formation of optical waveguides are desired. FIG. 2 shows a side section view of the glass substrate according to FIG. 1 along the line A—A. In the primary embodiment of the invention shown in FIG. 1, the mask opening 3 comprises at one end of the glass substrate a short portion 3a substantially parallel with the glass substrate and a longer portion 3b, which, in the direction toward the other end of the glass substrate, curves or parts slowly in a small angle of e.g. about 1 degree or less, typically in an angle of 0,1 to 0,2 degrees, away from the direction of the longitudinal axis of the short portion 3a. Alternatively, the short portion 3a of the mask opening 3 can also branch into two portions like portion 3b, curving slowly in different directions.

Figure 3:
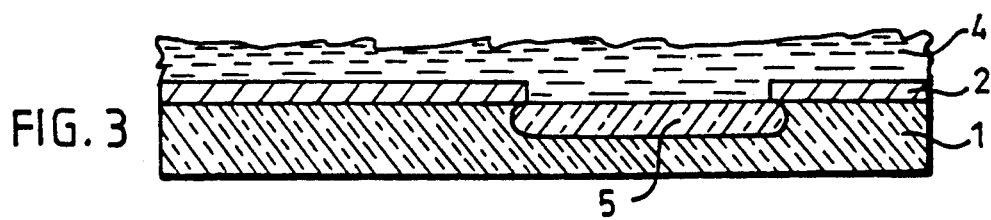
Figure 4:
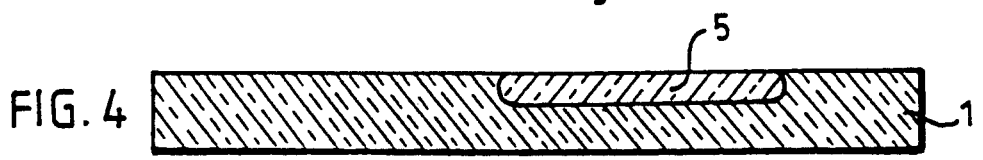
Figure 5:
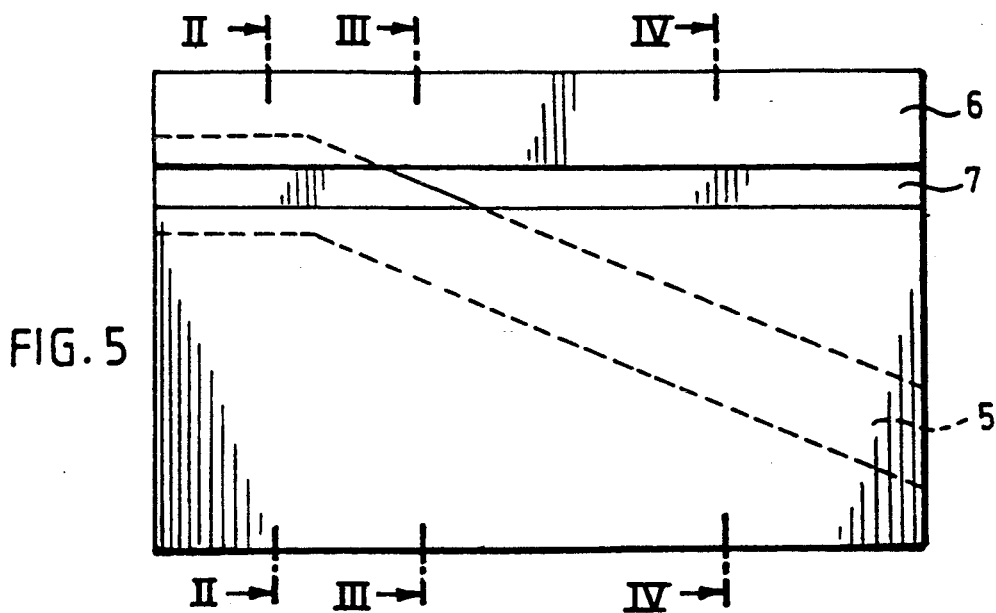

The following step comprises a production of a single-mode optical waveguide 5 through the mask opening 3 on the glass substrate 1 by K-Na ion exchange, by allowing a suitable ion source 4, such as a salt melt, affect the surface of the glass substrate 1 exposed by the mask opening 3, as shown in FIG. 3. After the step of FIG. 3, the ion-exchange mask 2 is removed from the surface of the glass substrate 1, and subsequently, the optical waveguide 5 according to FIG. 4 produced by K-Na ion exchange remains on the glass substrate 1.

After this, the same planar surface of the glass substrate 1 is provided with a thin metallic film 6 with a straight mask opening 7 transverse to the glass substrate 1 and substantially parallel with the longitudinal axis of that portion of the K-Na ion-exchanged optical waveguide 5 which was formed in the step of FIG. 3 at the short portion 3a of the mask opening 3. Thus the mask opening 7 overlaps at its one end said portion of the optical waveguide 5 and the overlapping changes slowly in the longitudinal direction of the mask opening 7, until the mask opening 7 at its other end is totally offset from the optical waveguide 5. FIGS. 6A, 6B and 6C are cross-sections of the glass substrate of FIG. 5 along the lines B-B, C-C and D-D, respectively, illustrating the overlapping of the mask opening 7 and the optical waveguide 5 in the longitudinal direction of the mask opening 7.

The following step comprises an Ag-Na ion exchange preferably at a temperature substantially lower than that of the K-Na ion exchange of FIG. 3, by allowing a suitable ion source 8, such as a salt melt, affect the surface of the glass substrate through the ion-exchange mask opening 7. FIGS. 7A, 7B and 7C illustrate such an ion exchange at cross-sections of the glass substrate 1 of FIG. 5 along the lines B-B, C-C and D-D. In the regions where the mask opening 7 of the ion-exchange mask 6 overlaps the K-Na ion-exchanged optical waveguide 5, no Ag ion exchange occurs between the glass substrate 1 and the ion source 8, because the almost stationary K ions prevent a diffusion of Ag ions in the glass substrate 1 nearly totally, as shown in FIG. 7A. On the other hand, the mask opening 7 being at its other end completely offset from the K-Na ion-exchanged optical waveguide 5, the Ag-Na ion exchange can take place totally normally and the properties of a single-mode optical waveguide 9 formed in this way are determined totally on the basis of the process parameters of the Ag-Na ion exchange, as shown in FIG. 7C. Within the area between the ends of the mask opening 7, the mask opening 7 overlaps partly the K-Na ion-exchanged optical waveguide 5 and the overlapping changes slowly in the direction of the longitudinal axis of the mask opening 7, whereby the Ag-Na ion exchange takes place only along a part of the width of the mask opening 7, as shown in FIG. 7B. After the Ag-Na ion exchange, the ion-exchange mask 6 is removed, which leads to a final result consisting of an optical waveguide parallel with the mask opening 7, the field distribution of light of which waveguide changes slowly, i.e. adiabatically, in the direction of the longitudinal axis of the optical waveguide from the field distribution of the K-Na ion-exchanged optical waveguide 5 to the field distribution of the Ag-Na ion-exchanged optical waveguide 9, as shown in FIG. 8. In the FIG. 8, which shows the resulting adaptor device, the adiabatically changing interface between the optical waveguides 5 and 9 is indicated by reference numeral 10. It shall be noted that the propagation coefficient of the fundamental mode of the optical waveguide 9 shall be higher than that of the optical waveguide 5.

The enclosed figures and the description relating thereto are only intended to illustrate the present invention. As to the details, the process and the adaptor device according to the invention can vary within the scope of the enclosed claims.

I claim:

1. An adaptor device for coupling together optical waveguides produced by K-Na ion exchange and optical waveguides produced by Ag-Na ion exchange, wherein the adaptor device comprises an optical waveguide produced on a glass substrate by ion-exchange technique, in the fundamental mode of which waveguide the field distribution of light changes adiabatically in a longitudinal direction of the optical waveguide from the field distribution of light of the fundamental mode of an optical waveguide produced by K-Na ion exchange at a first end portion to the field distribution of light of the fundamental mode of an optical waveguide produced by Ag-Na ion exchange at a second end portion.

2. An adaptor device according to claim 1, wherein the field distribution changes in an angle of about 1° or less with respect to the longitudinal axis of the optical waveguide.

3. An adaptor device according to claim 1 or 2, wherein the first end portion of the optical waveguide produced by K-Na ion exchange is wider than the second end portion of the optical waveguide produced by Ag-Na ion exchange.

4. A process for the production of an adaptor device, the process comprising
   a production of a first optical waveguide on a glass substrate by K-Na ion-exchange,
   a formation of an ion-exchange mask on the glass substrate in such a way that a longitudinal mask opening in the ion-exchange mask at its one end overlaps the first optical waveguide, the amount of overlapping changing adiabatically in the direction of the longitudinal axis of the mask opening, and
   a production of a second optical waveguide on the glass substrate by Ag-Na ion-exchange by using said ion-exchange mask.

* * * * *